United States Patent [19]

Casadei

[11] 4,192,363
[45] Mar. 11, 1980

[54] AUTOMATIC PROFILE-COPYING DEVICE

[76] Inventor: Gianfranco Casadei, Villa Verucchio (Forlì), Italy

[21] Appl. No.: 883,026

[22] Filed: Mar. 3, 1978

[30] Foreign Application Priority Data

Mar. 3, 1977 [IT] Italy .................. 20864 A/77

[51] Int. Cl.² .............................. B23C 1/18
[52] U.S. Cl. .................. 144/145 A; 144/154; 409/97; 409/104
[58] Field of Search .............. 90/13.4, 13.2, 13.3; 83/40, 413, 565; 144/137, 139, 144 A, 144.5, 145 R, 145 A, 145 C, 154

[56] References Cited

U.S. PATENT DOCUMENTS

| | | | |
|---|---|---|---|
| 660,642 | 10/1900 | Keyes | 144/145 |
| 1,809,488 | 6/1931 | Neple et al. | 144/145 R |
| 2,142,863 | 1/1939 | Whitney | 144/145 A |
| 3,459,104 | 8/1969 | Parsons, Sr. | 144/145 R |
| 3,473,580 | 10/1969 | Dunn et al. | 144/145 A X |
| 3,584,665 | 6/1971 | Gemmani | 144/145 A |
| 3,880,048 | 4/1975 | Zimmerman | 144/145 A |
| 4,036,269 | 7/1977 | Rhodes | 144/145 R X |

*Primary Examiner*—Robert L. Spruill
*Assistant Examiner*—W. D. Bray
*Attorney, Agent, or Firm*—Allison C. Collard; Thomas M. Galgano

[57] ABSTRACT

An automatic profile-copying device to be used in conjunction with machine tools of the type wherein a profile carrying the workpieces is caused to advance by being drawn between a pair of rollers between which it is clamped. One of the rollers is coaxial with the working tool of the machine and is driven by a motor operated at an adjustable but constant speed, while the other roller is thrust against the first roller in a substantially elastic manner and is rotated at a variable speed.

3 Claims, 1 Drawing Figure

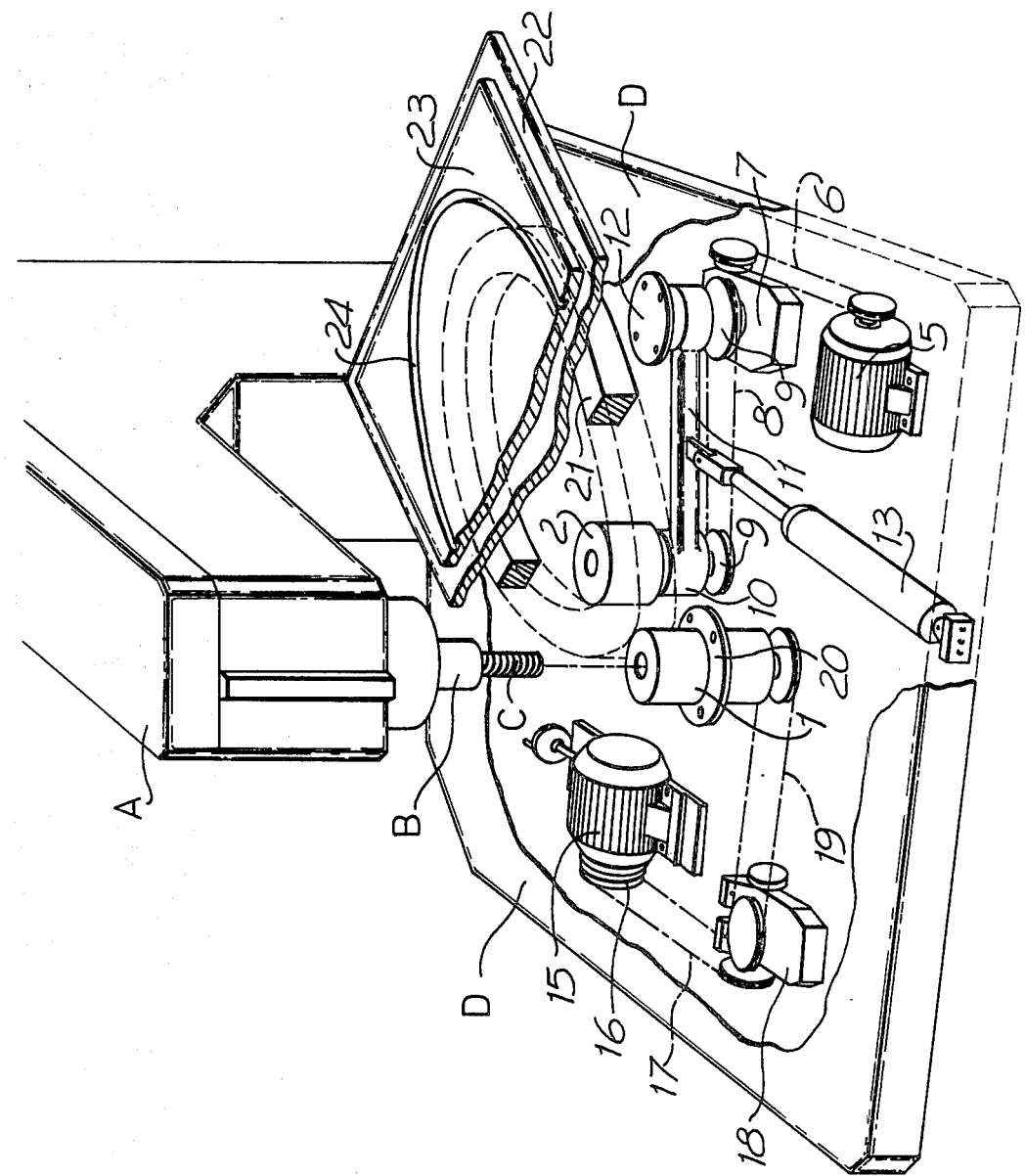

AUTOMATIC PROFILE-COPYING DEVICE

BACKGROUND OF THE INVENTION

The present invention relates to an improved automatic profile-copying device. More particularly, it relates to such a device specifically adapted for use in association with machines for milling flat pieces of different shapes with a mixed-line or irregular contour of the type using two opposed driven rollers for advancing a profile to which is secured the workpiece to be worked upon. The device according to the invention is particularly suited for machines of the type used to work on elements of wood and similar materials.

As is well known, grooving, profiling and shaping operations are carried out on machines with the tool shaft projecting from the working plane of the machine, known as milling machines with a vertical lower shaft, or else on machines with the tool shaft placed over the working plane of the machine, known as milling machines with a vertical upper shaft. The device according to the present invention is suitable for application on both typs of such milling machines, as well as on similar machines which requre the employment of an operating unit to perform an operation upon differently-shaped workpieces having mixed-line or irregular contours.

Moreover, as is also known with respect to devices of this type (which include two opposed rollers, of which at least one is driven and between which rollers the profile is advanced), in order to obtain a suitable advancing force at least the driven roller is covered with a high-friction enhancing material (for example, rubber or the like), while external means are provided to compress the profile between the rollers. The fundamental characteristic of the devices of this type lies in the fact that one roller, referred to as the "central roller", has its axis fixed and concentric with respect to the axis of the tool shaft, while the second roller, referred to as the "auxiliary or side roller", has its axis parallel and spaced from that of the central roller and is movable relative thereto, so as to guarantee, on one hand, easy insertion and removal of the profile between the rollers at the beginning and at the end of the operation and, on the other hand, the presence of a constant pressure on the profile, as is required for advancing the profile therebetween even if the profile thicknes varies. In fact, the means providing the force pressing the two rollers against the profile, always act elastically on the side roller, while the central roller is maintained in a fixed, accurate, coaxial position relative to the tool shaft of the milling machine to which the device is associated, so as to ensure an accurate copying of the intended milling configuration or contour.

The fundamental problem with this type of device is that, while the central roller rotates at a fixed speed so as to ensure a constant speed of advancement of the workpiece against the tool, the side roller does not rotate at a speed which should be variable according to the shape of the profile (except, of course, for the rectilinear profile portions or lengths). Up to now, this problem has been solved in various ways, none of which, however, has proved to be fully satisfactory. According to a first solution, only the central roller is driven and the side roller is freey rotatable. In this case, however, although there is the advantage of a constant advancing speed of the workpiece with respect to the tool, there is also the great disadvantage that it does not, for the most part, allow for the rotation of the profile in a manner correponding to its configuration and, in particular, any of its sharply bent points. In fact, the central roller acts with a torque for causing the rotation of the profile wich is only equal to the friction force onto its surface multiplied by its radius.

It has also been proposed to drive only the side roller, which acts to cause the rotation of the profile with a torque equal to the friction force on its surface multiplied by the radius of the central roller plus the thickness of the profile. It has then been possible to obtain a far higher capability of rotation than in the previous case. This, however has led to the drawback that the speed of advancement of the workpiece towards the tool is no longer constant (except for rectilinear profile lengths or portions). In particular, compared to the speed with the rectilinear profile lengths, there is a deacceleration with respect to convex profile lengths and an acceleration with respect to concave profile lengths.

In order to eliminate the drawbacks deriving from the driving of only one of the two rollers, it has been proposed to drive both rollers, at different speeds and, preferably, with the central roller driven at a constant speed and the side roller driven at a variable speed (i.e., by employing means which allow the side roller to rotate at a variable speed). With such a double roller drivn device, the profile can move according to an appropriate law or more appropriate travel path to improve the efficiency of the working operation. In addition, it is, of course, possible to obtain a higher drawing or pulling force, which is very useful in the case of relatively heavy workpieces and which is, in any event, always appropriate. A first way of realizing this concept is by introducing a differential mechanism allowing the shafts of the two rollers to rotate at different speeds driven by a single motor, the shaft of which rotates at constant speed. In this case, there is a very good drawing or pulling force but the speed of advancement of the piece towards the tool is not constant, since the path with constant advancing speed is not that in correspondence with the tool, but that coinciding with the center line of the profile thickness. A second, more practical method takes into account the opportuneness of rotating the central roller at a fixed speed and of preventing, at the same time, the profile from sliding with respect to such roller. For this purpose, a friction joint is inserted in the transmission of the side roller (which is rotated at the same time as the central roller, also in this case by a single motor). The friction joint allows the side roller to rotate at different speeds always providing a torque. Of course, to make sure that the friction joint does not act as brake instead of acting as drive mechanism motor, the speed of the inlet shaft of the joint itself is kept slightly above the maximum speed which may be required during movement of the profile, so that the friction joint continuously slides only in the desired direction. This system solves the problems of the aforementioned devices, but it has the rather considerable drawback of requiring more power than that typically required for feeding the profile, since a notable amount of power is lost in the friction joint. Moreover, this latter point constitutes a weak point of the device from the point of view of construction and maintenance.

SUMMARY OF THE INVENTION

The object of the present invention is to supply a profile-copying device which, while solving equally well the typical problems of such previously described mechanisms, is of simpler and safer construction and requires not much more power than it is necessary for advancing the profile.

In accordance with the present invention, this object is achieved by the provision of a device which includes two rollers for advancing the profile, one of which is coaxial with the working tool of the machine to which the device is applied and which is driven by a motor rotating at an adjustable constant speed, while the other of which is pushed towards the first by means acting in a substantially elastic way and is rotated by means which supply a torque at variable and even considerably different rotational speeds.

Preferably, the means which supply the side roller with a torque at variable rotation speeds comprises an "underfed" asynchronous electric motor, i.e., an asynchronous electric motor being fed at a voltage far lower than the rated voltage.

BRIEF DESCRIPTION OF THE DRAWING

The invention will now be described in further detail, with reference to the accompanying drawing which is a fragmentarily-illustrated perspective view of a preferred embodiment of the device according to the invention, with portions broken away to show internal construction.

DESCRIPTION OF THE PREFERRED EMBODIMENT

Referring now in detail to the drawing, therein illustrated is a milling machine which includes an upper horizontally-disposed head A from which depends a vertically-extending tool shaft B which carries a tool C, spaced above a work table D, in which the device according to the invention is incorporated.

The device according to the invention essentially consists of two rollers, a central roller 1 and a side or auxiliary roller 2 and two distinct drive units for each of the rollers. The motors, reduction units and transmissions of each of the drive units are arranged under the work table D, by means of supports with throughshafts, so as to be able to advance the profiles with the workpieces to be worked above the plane of work table D.

The drive unit of side roller 2 uses, according to the invention, an asynchronous electric motor 5 which can be defined as "underfed", in that its rated voltage is considerably higher than the voltage actually feeding the device. Motor 5 is coupled via a belt and pulley drive assembly 6 to a worm reduction unit 7, which, in turn, is coupled via a chain gearing 8 with pinions 9, to side roller 2, the shaft of which is retained in a support 10. Support 10 is pivotably mounted by means of an arm 11 and a support 12, coaxially disposed relative to the slow shaft of the reduction unit 7, so as to keep unaltered the distance between the centers of the chain gearing 8, when side roller 2 is moved away from central roller 1, to allow insertion of the profiles and, in turn, advancement thereof between the rollers. To arm 11 is connected a pneumatic cylinder 13 which is anchored, at the other end, to work table D so as to enable, when in the extended position thereof, side roller 2 to move away from central roller 1, and when in the retracted position thereof, the profiles to be clamped between the two rollers, supplying also the required elastic compression force for feeding the profiles therethrough.

The drive unit of the central roller 1 includes an asynchronous electric motor 15 fed in a conventional way (i.e., having its rated voltage equal to the voltage feeding the device), a variable pulley 16 coupled to motor 15 and mounted on an adjustable slide for regulating the pulling or drawing speed of the profile. Pulley 16 is coupled via a belt and pulley drive 17, to a worm reduction unit 18, which, in turn, is coupled via a chain gearing and pinion assembly 19 (shown schematically) to a support 20. Support 20 carries the shaft of central roller 1 in a coaxial manner relative to the tool shaft B of the milling machine.

The workpiece assembly drawn or pulled by the heretofore described profiling device includes a generally oval-shaped profile 21 of rectangular cross-section, and a panel 22, which is rigidly fixed to the bottom of profile 21. The workpiece to be milled is secured to the top surface of panel 22 by means of suitable fixing members of any known type. In the embodiment illustrated in the drawing, the tool cuts into the working piece 23 a grooving or channel 24, following the shape or contour of profile 21.

As previously noted, the device heretofore described and illustrated is equipped, fr driving the side roller 2, with an "underfed" asynchronous electric motor 5, that is, a conventional electrical asynchronous motor which is fed with a considerably lower voltage than the rated voltage provided therefor, and which is consequently apt to work without any serious problems with considerable inner slips (thanks to the limited magnetic flux which links the stator and rotor windings), in order to supply a torque with various speeds which may even widely differ. In practice, if the motor 5 is appropriately "underfed", it supplies a suitable torque for speeds varying from the very low speeds up to almost the highest rotation speed corresponding to the polarity of the motor itself, without undergoing the well-known overheating phenomena which are present in asynchronous motors being rotated—with a voltage feed equal to the rated voltage feed—at a speed lower than the rated speed. Such a motor is therefore an ideal means for adapting the rotation speed of the side roller 2 of the device to the requirements of the moment, without the side roller failing to provide a torque for carrying out the drawing of the profile between the rollers.

In operation, cylinder 13 is activated so that roller 2 is moved away from fixed roller 1 and the profile 21 is then inserted between rollers 1 and 2, such that the panel 22 is then disposed parallel to the plane of the work table D. The cylinder 13 is then again actuated in the opposite direction, so as to force roller 2 against profile 21 and the latter against roller 1. The milling machine with the device associated thereto is now started, whereby the profile 21, with the panel 22 and the piece to be worked 23, are moved under the pulling or advancing action of the rollers 1 and 2, below tool C, which is then lowered to perform the grooving 24 on the workpiece 23 secured to panel 22. The rollers 1 and 2 (of which roller 1 provides for the constant advancing speed of the workpiece 23 against the tool C) impart a movement to the profile 21 in an absolutely safe way by pulling or advancing the profile substantially without any slipping even when there is considerable inertia. Of course, in addition to the grooving 24, many other profile cuttings could be performed on the workpiece 23, as known.

At the completion of the milling operation and after stopping the operation of rollers 1 and 2, pneumatic cylinder 13 is again operated in order to free profile 21 from the grip of the rollers and to provide it with a new workpiece.

It should be understood that, in addition to the aforedescribed embodiment of the invention—which appears at present to be the most practical one—other, equally efficient embodiments may be provided. In particular, the "underfed" asychronous motor 5 could be replaced by a unit comprising a traditional asynchronous motor, a "self-zero-setting" hydraulic pump (that is, a pump apt to automatically supply oil at an almost constant pressure with variable delivery upon request), and a fixed-displacement hydraulic motor connected to the side roller 2. In this case, one would obtain, on the side roller, a practically constant torque determined by the pressure in the hydraulic circuit, and a speed varying continuously from a minimum to a maximum. Or else, it would even be possible to operate the side roller 2 with a mechanical drive with fixed ratio, by means of a compressed-air motor having the characteristic of supplying an almost constant torque (proportional to the air pressure) and a speed varying according to the requirements. To control the variable speed rotation of the roller 2, it is moreover possible to use a direct current motor having an automatic adjustment system. In each case, the important point is to control independently the rotation of the two rollers, so that the central roller may rotate at a constant speed and the side roller at a variable speed, in order to satisfy not only the requirements of shape of the various profiles, but also the requirements deriving from the fact that, normally, the constant rotation speed of the central roller may be varied (by means of an appropriate stepless variator, for example, with an expanding pulley as shown) so as to have various constant speeds for advancing the profile.

What is claimed is:

1. An improved profile-copying device for a milling machine having a work tool of the type including a rotatable central roller having an axis fixably and coaxially disposed relative to the axis of the work tool and a rotatable side roller having an axis disposed parallel to said axis of said central roller, means for driving at least one of said rollers and means for biasing said side roller in a direction towards said central roller so as to enable a profile to be inserted between and held by said rollers and advanced therebetween upon activation of said drive means, the improvement comprising:

said drive means comprising first drive means including a motor coupled to said central roller for rotating said central roller at an adjustable but constant speed, and second drive means coupled to said side roller for rotating said side roller at a variable speed as a result of which both of said rollers supply a torque to effect advancement of a profile fed between said rollers.

2. The device according to claim 1, wherein said second drive means includes an underfed electric asynchronous motor.

3. The device according to claim 1, wherein said means for biasing comprises a pneumatic cylinder.

* * * * *